United States Patent

[11] 3,634,185

[72] Inventor Jan Willem Hendrik Faber
Hilton, N.Y.
[21] Appl. No. 773,342
[22] Filed Nov. 4, 1968
[45] Patented Jan. 11, 1972
[73] Assignee Eastman Kodak Company
Rochester, N.Y.
Original application Nov. 21, 1966, Ser. No. 595,572, now abandoned. Divided and this application Nov. 4, 1968, Ser. No. 773,342

[54] LAMINATED MAGNETIC RECORDING ELEMENT
15 Claims, No Drawings

[52] U.S. Cl.................................... 161/183,
117/235, 117/239, 161/232, 161/249, 161/252, 274/41.4
[51] Int. Cl......................................... H01f 10/02, H01f 10/04
[50] Field of Search............................ 274/41.4; 161/182, 183, 231, 232, 247, 249, 252; 117/235, 239, 161 K, 138.8 F

[56] References Cited
UNITED STATES PATENTS

| | | | |
|---|---|---|---|
| 2,808,390 | 10/1957 | Caldwell...................... | 260/75 |
| 3,009,847 | 11/1961 | Alles et al. .................... | 161/164 |
| 3,033,822 | 5/1962 | Kibler et al. .................. | 260/47 |
| 3,041,314 | 6/1962 | Temin .......................... | 260/75 |
| 3,054,703 | 9/1962 | Brasure ........................ | 161/232 X |
| 3,179,533 | 4/1965 | Rusch........................... | 117/76 |
| 3,215,554 | 11/1965 | Loots ........................... | 117/138.8 X |
| 3,437,510 | 4/1969 | Diaz............................. | 117/138.8 X |
| 3,440,091 | 4/1969 | Delmore....................... | 117/216 |
| 3,547,693 | 12/1970 | Huguenard................... | 117/235 |

*Primary Examiner*—Harold Ansher
*Attorneys*—W. H. J. Kline, Bernard D. Wiese and Gerald E. Battist

ABSTRACT: This invention relates to a support having coated thereon a layer comprising a condensation interpolymer of (a) a monocyclic or fused ring dibasic aromatic carboxylic acid, (b) a 1,3-cycloalkyl dicarboxylic acid and (c) an aliphatic diol, said condensation polymer comprising at least 15 mole percent (b).

LAMINATED MAGNETIC RECORDING ELEMENT

This application is a divisional application of U.S. Ser. No. 595,572 filed Nov. 21, 1966, now abandoned.

This invention relates to polymeric linear interpolyesters. In one aspect this invention relates to linear interpolyesters comprising the condensation product of (a) dibasic aromatic carboxylic acid, (b) a 1,3-cycloalkyldicarboxylic acid and (c) an aliphatic diol. In another aspect this invention relates to a strongly adherent subbing material for polymeric supports and a method for making coated articles. In still another aspect, this invention relates to a magnetic element having a novel structural assembly and a means for making said element.

It has been the object of extensive research in past years to find new subbing layers for polymeric supports to increase their versatility and to provide a means for obtaining strongly adherent bonding of normally nonadherent materials. For example, in the manufacture of magnetic tape the resins and binders which provide good properties in the magnetic dispersion layer are generally incompatible with the desired support materials. Subbing layers which have been found to be adherent to one material are often quite incompatible with other support materials. Moreover, prior art subbing compositions have been found to contain appreciable residual reaction products and require extensive filtration to obtain a relatively uniform subbing composition for a high-quality magnetic tape element. Furthermore, it has been an object to achieve a uniformly soluble composition in a conventional coating solvent to obtain uniform coating by the solvent coating techniques.

A serious problem encountered in the manufacture of magnetic tape is a residual powder formation in the subbing composition which exudes to the surface of the element upon use. The powder appears to be a residual reaction product due to formation of low molecular weight polymers such as dimers and trimers in the polymerization of the composition. The powder, upon exudation to the surface, accumulates on the recording heads causing obliteration of the recorded signal which is fatal where each bit of information on the tape represents a sequential command.

It is, therefore, an object of this invention to provide a new composition of matter.

It is another object of this invention to provide a new composition of matter which can be used in a subbing layer for polymeric supports.

It is another object of this invention to provide a new subbing composition which will provide good bonding strength to a support and to a resinous dispersion containing a magnetically susceptible material.

It is another object of this invention to provide a new composition of matter which is a good, subbing material for polymeric supports and with material is relatively free of residual reaction products which affect the physical properties of the sub for magnetic tape uses.

It is furthermore an object of this invention to provide a novel composition which can be produced with consistent composition properties and is soluble in organic halocarbon solvents at room temperatures.

It is another object of this invention to provide a new composition of matter which does not contain substantial amounts of residual low molecular weight polymeric product such as dimers and trimers which exude from the composition.

It is also another object to provide a novel laminate structure and means for producing the same.

Additional objects will become apparent from the specification and claims.

These and other objects are accomplished by a novel polymeric composition comprising a condensation interpolymer of at least one dibasic aromatic acid component, such as terephthalic acid, dimethylterephthalate, isoterephthalic acid, and etc., a 1,3-cycloalkanedicarboxylic acid component such as 1,3-cyclopentane dicarboxylic acid, dimethyl 1,3-cyclopentane dicarboxylate, 1,3-cyclohexane dicarboxylic acid and etc., and an aliphatic diol, said polymer comprising at least 15 mole percent of 1,3-cycloalkyldicarboxylic acid units, in polymerized form. An interpolyester condensation product containing 1,3-cycloalkyldicarboxylic acid units provides a composition which is strongly adherent to a wide variety of supports including polymeric supports such as linear polyester materials, cellulose acetate materials, polycarbonate materials, polyvinyl materials, and etc. Moreover, the interpolyester condensation product provides a means to achieve excellent adherence to resinous dispersions of a magnetically susceptible material such as, for example, ferromagnetic oxide in polyvinyl butyral.

The interpolyesters of this invention have utility for many uses, however, the interpolyesters have highly advantageous properties desirable for subbing layers and also in the fabrication of magnetic recording elements. The interpolyester compositions of this invention have relatively high solubility in halocarbon solvents such as methylene chloride as compared to related subbing compositions. The new interpolyesters can be dissolved in methylene chloride to form a clear polymeric solution which can be filtered without clogging of the filters due to insoluble residual reaction products such as extremely high molecular weight polymers, insoluble side reaction products, etc.

The introduction of 1,3-cycloaliphatic dicarboxylic acid units, which have a structural configuration in a nonplanar "chair" form as opposed to the planar configuration for aromatic acid units, into the polyester polymerization apparently affects the condensation reaction in a manner to produce a very uniform product which has excellent tenacity to a wide variety of polymeric materials. Apparently the reaction mechanism is inherently changed in such a manner that polymer chain growth terminates without substantial formation of cyclic dimers and trimers. Low molecular weight cyclic dimers and trimers migrate to the surface of the composition after manufacture and especially upon repeated flexing of the material; virtually no white powder associated with dimer and trimer formation migrates from the present interpolyester compositions.

The interpolyesters of this invention can be made using any suitable condensation reaction for the desired purpose, including alcohol-acid condensation reactions, transesterification reactions and the like which are known in the art for producing linear polyesters. In a typical procedure, the reactants and catalysts, such as dibutyl tin oxide, are heated under nitrogen to effect the esterification after which heating is continued under a vacuum to complete polymerization.

Based on the total acid components in the interpolyesters at least 30 mole percent is 1,3-cycloalkyldicarboxylic acid. Based on interpolymer, about 15 mole percent consists of said acid units. In a preferred embodiment for subbing purposes the 1,3-cycloalkyldicarboxylic acid comprises from about 40 to about 60 percent of the acid units in said interpolymer. This preferred range provides an interpolymer with very good solubility in the halocarbon solvents which can be used in solvent coating operations. The representative composition of such a polymer comprises about 20 to about 30 mole parts of the 1,3-cycloalkyldicarboxylic acid, about 30 to about 20 mole parts of the dibasic aromatic acid and about 50 mole parts of the aliphatic diol. Generally a 5 to 20 percent clear polymeric solution of the polymer by weight can be formed in a solvent such as methylene chloride in this range; the solution can then be adjusted to the desired concentration for solvent coating. The high degree of solubility is quite unexpected since related polymeric materials have only limited solubility and generally the related materials contain insoluble materials, some of which clog the filters upon filtration and some of which pass through the filter clouding the solution.

A very good range of 1,3-cycloaliphatic dicarboxylic acid in the interpolymer is about 40 to about 50 mole percent of said acid based on the total acid components in said interpolymer. This embodiment is soluble in concentrations of about 10 to about 20 percent polymer in methylene chloride providing a clear filterable solution. Of course, filtration is normally carried out at the concentration at which the subbing will be applied to facilitate faster filtration. Generally a diluted solution containing 2 to about 5 percent polymer is subjected to filtration and coated as a subbing. This embodiment also provides a subbing layer which is very tenacious to both a linear terephthalate polyester support and to a polyvinyl butyral resin. Thus, it provides excellent adhesion in a magnetic element having said support and a magnetically susceptible material disposed in said resin.

Although generally the interpolymers comprising at least 30 mole percent of the 1,3-cycloalkyl dicarboxylic acid are good subbing layers for most polymers, the optimum properties will vary with the particular material to be subbed. Typical materials which can be subbed or which form tenacious bond with the interpolyester include linear polyester materials such as linear polyesters derived from terephthalic acid, isophthalic acid and the like; cellulosic polymers such as cellulose acetate, cellulose acetate butyrate, cellulose propionate and the like; polycarbonates; polyvinyl compositions such as polyvinyl butyral, polyvinyl chloride, polyvinyl acetate, polystyrene and the like; and surface-treated polyolefins such as polyethylene, polypropylene and the like.

The 1,3-cycloaliphatic dicarboxylic acids which are useful in this invention include those which are nonplanar in configuration including substituted and nonsubstituted cycloaliphatic compounds. Preferably a cycloaliphatic dicarboxylic acid having five or six carbon atoms in the ring wherein carboxyl substituents are attached directly to carbon atoms in 1 and 3 positions respectively of the ring are used in the reaction. Particularly useful acids or esters which can be used in the reaction to form the interpolymer are 1,3-cyclopentane dicarboxylic acid, dimethyl 1,3-cyclopentane dicarboxylate, 1,3-cyclohexane dicarboxylic acid, dimethyl 1,3-cyclohexane dicarboxylate, diethyl 1,3-cyclohexane dicarboxylate and the like.

The aliphatic diols which can be used in the condensation reaction to form the interpolymers include generally the polymethylene glycols including the branched and straight chain compounds. Preferably an aliphatic diol having from two to six carbon atoms is used in the reaction. Typical aliphatic diols employed are ethylene glycol, propylene glycol, propane diol, 1,3-butylene glycol, 1,3-tetramethylene glycol, neopentyl glycol and the like. It is often desirable to employ the aliphatic diol in a 0.4 mole excess in the reaction to assure complete reaction of the 1,3-cycloalkyl dicarboxylic acid and the aromatic acid.

The dibasic aromatic acid can be any aromatic acid or mixture of aromatic acids wherein the aromatic acids have at least two carboxy groups, the respective carboxy groups being attached to a benzene ring carbon atom. Typical useful dibasic aromatic acids are terephthalic acid, isophthalic acid, and etc. Fused rings can also be present such as in 1,4 or 1,5-naphthalene dicarboxylic acid. The dibasic aromatic acid is utilized at a concentration to provide the balance of the acid component of the interpolyester for each respective 1,3-cycloalkyl dicarboxylic acid concentration.

The solvents employed for coating the interpolyesters of this invention include common volatile organic solvents. Preferably halocarbon solvents such as methylene chloride, chloroform, propylene dichloride and other commonly used halocarbon solvents are employed in the solvent coating operation.

The invention can be further illustrated by the following examples of preferred embodiments thereof, although it will be understood that the examples are included merely for purposes of illustration and are not intended to limit the scope of the invention unless otherwise specifically indicated.

EXAMPLE 1

In a 200 cc. polymerization flask equipped with a still head and a gas inlet tube is placed 0.17 moles of dimethyl-1,3-cyclohexane dicarboxylate, 0.17 moles of dimethylterephthalate, 0.48 moles of ethylene glycol and 0.01 g. of dibutyl tin oxide.

The flask is placed in an oil bath having a temperature of 250° C. A gentle stream of nitrogen is passed through the reaction mixture to sweep out the methanol formed during the transesterification step.

When all the methanol has been distilled, the still head and the gas inlet tube are removed, and a stainless steel stirrer is placed in the reaction mixture. Vacuum is applied with a mechanical pump and heating continued. The polymerization is effected with stirring under a vacuum of 100μ. When the polymer begins to wrap around the stirrer, the reaction is terminated. An interpolymer is obtained, which is soluble in methylene chloride, having an inherent viscosity of 0.99, measured in a 50/50 mixture of chlorobenzene and phenol and a second order transition temperature of 35° C.

EXAMPLE 2

The composition of example 1 is dissolved in methylene chloride to form a clear 12 percent polymer solution. The solution is diluted to a 3 percent polymer concentration and coated on a polyethylene terephthalate film base. The solvent is evaporated leaving a strongly adherent coating on said film base. The resultant layer is free of any white deposit indicative of the absence of low molecular weight dimer or trimer in said composition A layer of ferromagnetic oxide dispersed in polyvinyl butyral is applied to said coating. The ferromagnetic oxide layer adhered with exceptional tenacity to the coated polyester film base. The magnetic layer and the subbing layer are scored with a razor blade and a piece of adhesive tape is applied to the second surface. The adhesive tape is rapidly pulled away at an angle approaching 180° without removing either the subbing layer or the oxide layer. Upon repeated flexing no white powder migrated to the surface from the subbing layer.

Interpolyester compositions comprising respectively 40, 42.5, 45 and 47.5 mole percent 1,3-cyclohexane dicarboxylic acid units of the total acid component of said polymer are prepared in accordance with example 1 and tested by the above procedure. The interpolyester comprising from about 42.5 to about 47.5 mole percent 1,3-cyclohexane dicarboxylic acid units are soluble in methylene chloride at about 20° C. in concentrations of up to about 20 percent polymer and form a clear solution which can be filtered without extensive clogging of the filter by insoluble fractions of the polymer. These interpolymers provide excellent bonding to linear polyester supports and to polyvinyl butyral resins.

In contradistinction a polymer prepared in accordance with example 1 comprising 10 percent 1,3-cyclohexane dicarboxylic acid units in said polymer is a hard crystalline polymer which is substantially insoluble in halocarbon solvents. Melt coatings of this polymer have very low adhesion to support materials such as polyethylene terephthalate.

EXAMPLE 3

An interpolyester is produced in a similar manner to example 1 using 70 mole parts dimethyl terephthalate to 30 mole parts dimethyl 1,3-cyclohexane dicarboxylate in the reaction mixture. Ethylene glycol is used as the aliphatic diol. The polymer obtained has an inherent viscosity of 0.64 measured in a 50/50 mixture of chlorobenzene and phenol and a second order transition temperature of 47° C. A methylene chloride solution of this polymer is applied to an oriented polyethylene terephthalate film resulting in good adhesion to the film.

EXAMPLE 4

An interpolyester is produced in a similar manner to example 1 using 25 mole percent dimethyl terephthalate and 75 mole percent dimethyl-1,3-cyclohexane dicarboxylate. Ethylene glycol is used as the aliphatic diol. The polymer obtained has an inherent viscosity of 0.88 measured in a 50/50 mixture of chlorobenzene and phenol and a second order transition temperature of 20° C. A methylene chloride solution of this polymer is applied to a polyethylene terephthalate film and to a polycyclohexyldimethylene terephthalate film resulting in good adhesion with no subsequent white powder formation.

Similar results are obtained when isophthalic acid 1,3-cyclopentane dicarboxylic acid and ethylene glycol are reacted in the molar rations by the procedure above described.

EXAMPLE 5

An interpolyester is produced in a similar manner to example 1 using 10 mole percent dimethyl terephthalate and 90 mole percent dimethyl-1,3-cyclohexane dicarboxylate. Ethylene glycol is used as the aliphatic diol. The polymer obtained has an inherent viscosity of 0.56 measured in a 50/50 mixture of chlorobenzene and phenol and a second order transition temperature of 18° C. A methylene chloride solution of this polymer was applied to a polyethylene terephthalate film resulting in good adhesion to the film.

EXAMPLE 6

In a 100 cc. polymerization flask equipped with a still head and a gas inlet tube is placed 0.17 moles of dimethyl terephthalate, 0.13 moles of dimethyl cis-1,3-cyclopentane dicarboxylate, 0.42 moles of ethylene glycol, and 0.01 g. of dibutyl tin oxide.

The flask is placed in an oil bath having a temperature of 250° C. A gentle stream of nitrogen is passed through the reaction mixture to sweep out the methanol formed during the transesterification step.

When all the methanol has been distilled, the still head and the gas inlet tube are removed, and a stainless steel stirrer is placed in the reaction mixture. Vacuum is applied with a mechanical pump and heating continued. The polymerization is effected with stirring under a vacuum of 100μ. When the polymer begins to wrap around the stirrer, the reaction is terminated. A polymer is obtained which is soluble in methylene chloride, having a viscosity of 0.64, measured in a 50/50 mixture of chlorobenzene and phenol and a second order transition temperature of 18° C.

Similar results are obtained when interpolymers are formed using propylene glycol and neopentyl glycol as the diol in place of ethylene glycol in the condensation reaction.

EXAMPLE 7

The compositions of example 6 are each respectively dissolved in methylene chloride and coated on a polyethylene terephthalate film base. The solvent is evaporated leaving a strongly adherent coating of said composition on said film base. The resulting layer in each instance is free of any low molecular weight powder deposits immediately after coating and after continued flexing of the coated film. A layer of ferromagnetic oxide dispersed in polyvinyl butyral was applied to each respective coating. The ferromagnetic oxide layer adhered with exceptional tenacity resulting in a laminated structure which withstood severe repeated bending and tape pulloff tests.

EXAMPLE 8

An interpolyester is prepared by the procedure of example 1 from a reaction mixture comprising 55 mole parts of dimethyl 1,3-cyclohexane dicarboxylate, 45 mole parts of dimethyl terephthalate and 100 mole parts of ethylene glycol. The interpolyester is added to a solution of 2 parts by volume cyclohexanone and 98 parts by volume of propylene dichloride to form a 3 percent solution. The solution is coated to a wet thickness of 0.004 inch upon a cellulose triacetate film support and dried. The dry subbing layer is scored with a razor blade and a piece of transparent adhesive tape is applied to the scored surface of the sub coating. The adhesive tape is pulled away at an angle approaching 180° without removing the subbing layer.

Similar results are obtained on cellulose acetate films when the 1,3-cyclohexane dicarboxylic acid comprises 40, 45 and 50 mole percent of the total acid content of said interpolyester.

EXAMPLE 9

An interpolyester is prepared by the procedure described in example 6 to form a polymer comprising 35 mole parts of cis-1,3-cyclopentane dicarboxylic acid, 65 mole parts of terephthalic acid and 100 mole parts of ethylene glycol. The interpolyester is dissolved in methylene chloride and then acetone and methanol are added in the ratio of 60 parts acetone and 20 parts methanol to 20 parts of the methylene chloride. The subbing solution is coated at a wet thickness of 0.004 inch upon a polycarbonate film base and dried. The dried subbing layer is scored with a razor blade and a piece of transparent adhesive tape applied to the scored surface of the subbing layer. The adhesive tape is peeled away at an angle of 180° without removing any of the subbing layer.

Similar results are obtained when an interpolyester having a 1,3-cyclopentane dicarboxylic acid concentration of 40, 50 and 60 percent based on the total acid concentration are coated on a polycarbonate base.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. An article comprising (1) a synthetic polymeric support selected from the group consisting of a linear polyester, polymeric cellulosic esters, polycarbonate materials and polyvinyl materials, having coated thereon (2) a layer comprising a polyester condensation interpolymer consisting essentially of (a) units of a monocyclic or fused ring dibasic aromatic carboxylic acid, (b) units of a 1,3-cycloalkyl dicarboxylic acid and (c) units of an aliphatic diol, said condensation interpolymer comprising at least 15 mole percent.

2. An article according to claim 1 wherein said support comprises a polymeric cellulosic ester.

3. The article according to claim 1 wherein said synthetic polymeric support comprises polyethylene terephthalate.

4. An article according to claim 1 further including a layer adjacent said interpolymer coating; said layer comprising a resinous dispersion of a magnetically susceptible material.

5. A laminated article according to claim 1 further including a layer adjacent said second layer, said layer comprising polyvinyl butyral.

6. An article according to claim 1 wherein said support comprises a linear terephthalate polyester composition and wherein said interpolymer has an acid composition of about 60 to about 50 mole percent of a dibasic aromatic carboxylic acid and from about 40 to about 50 mole percent of a 1,3-cycloalkyl dicarboxylic acid.

7. The article according to claim 6 wherein the condensation interpolymer comprises the reaction product of a 1,3-cyclohexane dicarboxylic acid, a terephthalic acid and ethylene glycol.

8. The article according to claim 6 wherein the condensation interpolymer comprises the reaction product of a 1,3-cyclopentane dicarboxylic acid, a terephthalic acid and ethylene glycol.

9. A magnetic recording element comprising (1) a synthetic polymeric support selected from the group consisting of a linear polyester, polymeric cellulosic esters polycarbonate materials, and polyvinyl materials, (2) a subbing layer disposed on said support, said subbing layer comprising a polyester condensation interpolymer consisting essentially of (a) units of a monocyclic or fused ring dibasic aromatic carboxylic acid, (b) units of a 1,3-cycloalkyl dicarboxylic acid and (c) units of an aromatic diol wherein said condensation polymer comprises at least 15 mole percent (b), and (3) a layer of thermoplastic polymeric material having dispersed therein a magnetically susceptible material adjacent said subbing layer.

10. The magnetic recording element according to claim 7 wherein said synthetic polymeric support comprises polyethylene terephthalate.

11. A magnetic recording element according to claim 9 wherein said thermoplastic polymeric material comprises polyvinyl butyral and wherein said magnetically susceptible material is a ferromagnetic oxide.

12. A magnetic recording element according to claim 9 wherein said subbing layer comprises a condensation polymer having an acid content of from about 60 to about 50 mole percent of said dibasic aromatic carboxylic acid and from about 40 to about 50 mole percent of a 1,3-cycloalkyl dicarboxylic acid.

13. A magnetic recording element comprising a linear terephthalate polyester support, a subbing layer disposed on said support comprising a polyester condensation interpolymer having an acid content of from about 60 to about 50 mole percent units of terephthalic acid and from about 40 to about 50 mole percent of units of 1,3-cyclohexane dicarboxylic acid and units of an aliphatic diol, and a layer of thermoplastic polyvinyl butyral having dispersed therein a ferromagnetic oxide adjacent said subbing layer.

14. The magnetic recording element according to claim wherein the condensation interpolymer comprises the reaction product of a 1,3-cyclohexane dicarboxylic acid, a terephthalic acid and ethylene glycol.

15. The magnetic recording element according to claim 12, wherein the condensation interpolymer comprises the reaction product of a 1,3-cyclopentane dicarboxylic acid, a terephthalic acid and ethylene glycol.

\* \* \* \* \*

PO-1050
(5/69)

UNITED STATES PATENT OFFICE
CERTIFICATE OF CORRECTION

Patent No. 3,634,185                  Dated January 11, 1972

Inventor(s) Jan W. H. Faber

It is certified that error appears in the above-identified patent and that said Letters Patent are hereby corrected as shown below:

```
Column 1, line 52, "with" should read ---which---.
Column 4, line 30, "second" should read ---scored---.
Column 7, Claim 10, "Claim 7" should read ---Claim 9---.
Column 8, Claim 14, "Claim  " should read ---Claim 12---.
```

Signed and sealed this 11th day of July 1972.

(SEAL)
Attest:

EDWARD M. FLETCHER, JR.            ROBERT GOTTSCHALK
Attesting Officer                  Commissioner of Patents